(12) United States Patent
Rocroi et al.

(10) Patent No.: US 11,845,315 B2
(45) Date of Patent: Dec. 19, 2023

(54) INTELLIGENT POWER MANAGEMENT WHILE IN CAMP MODE

(71) Applicant: Rivian IP Holdings, LLC, Irvine, CA (US)

(72) Inventors: Thomas Rocroi, Richmond, CA (US); Nathaniel Isaac Gallinger, Emeryville, CA (US); Erik Robert Glaser, San Mateo, CA (US); Jeffrey Park, Redwood City, CA (US); Andrea Marie Best, Mountain View, CA (US)

(73) Assignee: RIVIAN IP HOLDINGS, LLC, Irvine, CA (US)

( * ) Notice: Subject to any disclaimer, the term of this patent is extended or adjusted under 35 U.S.C. 154(b) by 0 days.

(21) Appl. No.: 18/091,039

(22) Filed: Dec. 29, 2022

(65) Prior Publication Data

US 2023/0311608 A1  Oct. 5, 2023

Related U.S. Application Data

(63) Continuation of application No. 17/966,677, filed on Oct. 14, 2022, and a continuation of application No.
(Continued)

(51) Int. Cl.
*B60G 17/017* (2006.01)
*B60W 10/22* (2006.01)
(Continued)

(52) U.S. Cl.
CPC .......... *B60G 17/017* (2013.01); *B60W 10/22* (2013.01); *B60W 40/105* (2013.01);
(Continued)

(58) Field of Classification Search
CPC ........... B60G 17/017; B60G 2400/204; B60G 2400/302; B60G 2400/41; B60G 2500/30;
(Continued)

(56) References Cited

U.S. PATENT DOCUMENTS

| 8,825,292 B2 | 9/2014 | Tseng et al. | |
| 11,560,034 B1 * | 1/2023 | Rocroi | B60W 50/0097 |

(Continued)

OTHER PUBLICATIONS

Lambert, Fred. (Dec. 23, 2019). "Tesla releases 'Camp Mode'_making some happy campers", electrek, located at: https://electrek.co/2019/12/23/tesla-camp-mode/, retrieved Dec. 6, 2022.

(Continued)

*Primary Examiner* — Hussein Elchanti
(74) *Attorney, Agent, or Firm* — Morrison & Foerster LLP

(57) ABSTRACT

Some embodiments may provide a method for a desired operating environment. A signal to place a vehicle in a designated mode corresponding to a desired operating environment may be received. The designated mode may include modifications to one or more default operating characteristics of the vehicle. The modifications may be while the vehicle is in parked mode and a vehicle access key associated with the vehicle is within proximity of the vehicle. In response to receiving the signal, characteristics of the vehicle to be modified in order to create the desired operating environment may be identified. The default operating characteristics may relate to power-consuming features or available power for connected accessories. One or more settings of the vehicle to change the default operating characteristics of the vehicle while in the designated mode may be modified.

20 Claims, 11 Drawing Sheets

Related U.S. Application Data

17/710,803, filed on Mar. 31, 2022, now Pat. No. 11,560,034.

(51) Int. Cl.
| | |
|---|---|
| *B60W 40/105* | (2012.01) |
| *B60W 50/00* | (2006.01) |
| *B60H 1/00* | (2006.01) |
| *B60R 25/24* | (2013.01) |

(52) U.S. Cl.
CPC ... *B60W 50/0097* (2013.01); *B60G 2400/204* (2013.01); *B60G 2400/302* (2013.01); *B60G 2400/41* (2013.01); *B60G 2500/30* (2013.01); *B60H 1/00642* (2013.01); *B60R 25/24* (2013.01); *B60W 2520/04* (2013.01); *B60W 2520/16* (2013.01); *B60W 2520/18* (2013.01); *B60W 2710/22* (2013.01)

(58) Field of Classification Search
CPC ............... B60W 10/22; B60W 40/105; B60W 50/0097; B60W 2520/04; B60W 2520/16; B60W 2520/18; B60W 2710/22; B60H 1/00642; B60R 25/24
See application file for complete search history.

(56) References Cited

U.S. PATENT DOCUMENTS

| | | |
|---|---|---|
| 2009/0027188 A1* | 1/2009 | Saban .................... B60N 2/002 340/439 |
| 2009/0091477 A1 | 4/2009 | McCall et al. |
| 2013/0346308 A1* | 12/2013 | Naito ..................... B60L 53/68 705/41 |
| 2016/0005285 A1 | 1/2016 | Balakrishna |
| 2016/0320469 A1 | 11/2016 | Laifenfeld et al. |
| 2017/0203626 A1 | 7/2017 | Guest et al. |
| 2020/0130454 A1 | 4/2020 | Lundy et al. |
| 2021/0291764 A1* | 9/2021 | Koda .................... B60R 25/246 |
| 2022/0048472 A1 | 2/2022 | Nilsson et al. |
| 2022/0063440 A1* | 3/2022 | Goldman-Shenhar ...................... B60L 58/13 |
| 2023/0086719 A1* | 3/2023 | Shin ........................ B60L 58/13 |
| 2023/0101555 A1* | 3/2023 | Hundert .................. H04W 4/38 455/414.1 |

OTHER PUBLICATIONS

Notice of Allowance dated Jun. 29, 2022, for U.S. Appl. No. 17/710,803, filed Mar. 31, 2022, eight pages.

Youtube. (Mar. 22, 2022). "Rivian R1T Infotainment Deep Dive! Here's Every Screen & Menu", Located at: https://www.reddit.com/r/Rivian/comments/tk4ezr/comment/i1qq6ky/?utm_source=share&utm_medium=web2x&context=3, retrieved Dec. 6, 2022.

Non-Final Office Action dated Apr. 19, 2023, for U.S. Appl. No. 18/091,240, filed Dec. 29, 2022, eight pages.

\* cited by examiner

INTELLIGENT POWER MANAGEMENT WHILE IN CAMP MODE

CROSS-REFERENCE TO RELATED APPLICATIONS

This application is a continuation of U.S. patent application Ser. No. 17/710,803, filed Mar. 31, 2022, and U.S. patent application Ser. No. 17/966,677, filed Oct. 14, 2022, the content of which is incorporated herein by reference in its entirety.

INTRODUCTION

Generally, vehicles have many settings that a driver may wish to configure depending upon a special situational use of the vehicle (e.g., when camping, tailgating, fishing, in a parade). In such special situations, a driver may want to apply modifications to vehicle configuration settings in order to create a desired environment for the special situational use.

SUMMARY

In particular embodiments, a method may provide for changing default operating characteristics of a vehicle while in a designated mode in order to create a desired environment for a special situational use of the vehicle. For example, if the vehicle is parked on a slope, it may be desirable to adjust a suspension of the vehicle in order to level the frame of the vehicle. In response to receiving an instruction to place the vehicle in the designated mode, a roll angle and a pitch angle of the vehicle as parked may be assessed. The assessment of the roll angle and the pitch angle may be based on data received from a position sensor built into the vehicle (e.g., a gyroscope). If the vehicle is not level, an electronically controlled suspension of the vehicle may be adjusted to reduce the roll angle or the pitch angle.

Sensors of the vehicle may collect information to be used in predicting a likelihood of collision with objects near the vehicle if the electronically controlled suspension of the vehicle were to be adjusted to be level. The vehicle may also determine whether a computed range of travel of the electronically controlled suspension required to level the vehicle is within a maximum possible range of travel of the electronically controlled suspension.

It may be desirable to adjust one or more other settings of the vehicle in order to create a desired environment for the special situational use. Such settings may be related to lights, sound-emitting components, displays, Heating, Ventilation, and Air Conditioning (HVAC) control systems, wireless communication systems, security systems, accessories, or a power control system of the vehicle. For example, settings of the power control system of the vehicle may control power delivery to essential vehicle functions, enabling power delivery to optional vehicle functions until the prescribed charge threshold, or disabling power delivery to unnecessary vehicle functions.

The embodiments disclosed above are only examples, and the scope of this disclosure is not limited to them. Particular embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category (e.g., method) can be claimed in another claim category (e.g., system) as well. The dependencies or references back in the attached claims are chosen for formal reasons only. However any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

DETAILED DESCRIPTION OF EXAMPLE EMBODIMENTS

In particular embodiments, a method may provide a user interface for changing default operating characteristics of a vehicle while in a designated mode in order to create a desired environment for a special situational use of the vehicle. For example, if the vehicle is parked on a slope, it may be desirable to adjust a suspension of the vehicle in order to level the frame of the vehicle. In response to receiving an instruction to place the vehicle in the designated mode, a roll angle and a pitch angle of the vehicle as parked may be assessed. The assessment of the roll angle and the pitch angle may be based on data received from a position sensor (e.g., a gyroscope) built into the vehicle. If the vehicle is not level, an electronically controlled suspension of the vehicle may be adjusted to reduce the roll angle or the pitch angle.

Sensors of the vehicle may collect information to be used in predicting a likelihood of collision with objects near the vehicle if the electronically controlled suspension of the vehicle were to be adjusted to be level. The vehicle may also determine whether a computed range of travel of the electronically controlled suspension required to level the vehicle is within a maximum possible range of travel of the electronically controlled suspension.

It may be desirable to adjust one or more other settings of the vehicle in order to create a desired environment for the special situational use. Such settings may be related to lights, sound-emitting components, displays, HVAC control systems, wireless communication systems, security systems, accessories, or a power control system of the vehicle. For example, settings of the power control system of the vehicle may control power delivery to essential vehicle functions, enabling power delivery to optional vehicle functions until the prescribed charge threshold, or disabling power delivery to unnecessary vehicle functions.

Figure 1A:
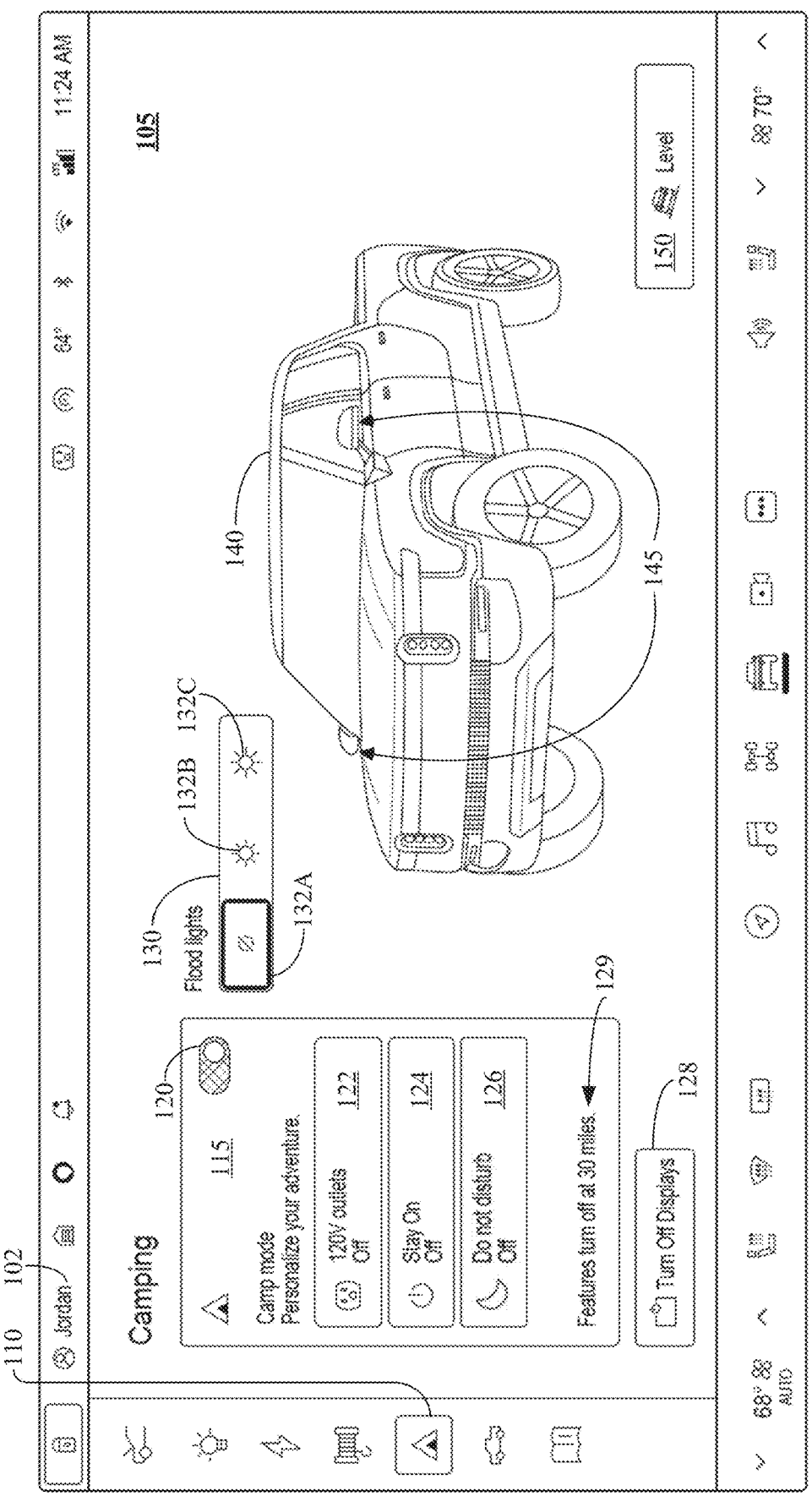
FIG. 1A illustrates an example user interface for configuring user settings of a vehicle related to camping.

FIG. 1A illustrates example user interface 100 for configuring user settings related to a vehicle. User profile 102 may be selected by a user. Camping mode page 105 may be opened by the user interacting with camping mode button 110. Camping mode page 105 may comprise camping mode menu 115. Camping mode menu 115 may comprise camping mode toggle 120. Camping mode toggle 120 may activate or deactivate one or more setting suites. The setting suites may comprise one or more settings. The one or more settings may be related to one or more outlets, a stay-on mode, or a do-not-disturb mode. Camping mode menu 115 may comprise 120V-outlets button 122, stay-on button 124, do-not-disturb mode button 126, or turn-off-displays button 128. Camping mode page 105 may also comprise charge warning 129 for one or more features of the vehicle turning off upon reaching a threshold charge. Camping mode page 105 may also comprise flood light control panel 130. Flood light control panel 130 may comprise flood-light off button 132A, flood-light low button 132B or flood-light high button 132C to control one or more flood lights. The one or more flood lights may be visualized in camping mode page 105 on vehicle representation 140 as flood lights 145. Camping mode menu 150 may also comprise leveling button 150.

In particular embodiments, the setting suites controllable by camping mode toggle 120 may be user-defined, and may include one or more users. The user-defined setting suites may be stored. The stored user-defined setting suites may be recalled by camping mode toggle 120. This may allow the user to quickly switch between personalized configurations for a designated use (e.g., camping) without having to adjust individual settings.

In particular embodiments, 120V-outlets button 122 may enable or disable one or more outlets of the vehicle. The one or more outlets may be classified as household outlets, USB outlets, or proprietary outlets. Each outlet classification may be individually configured to activate or deactivate depending on the status of 120V-outlets button 122.

In particular embodiments, the one or more outlets may be household outlets, wherein the household outlets may be 120V or 240V and may be Types A through N. The one or more outlets may also be USB outlets. The USB outlets may be USB Type A or USB Type C. The one or more outlets may also be a proprietary standard to be used with one or more vehicle accessories.

In particular embodiments, the stay-on mode which may be controlled by stay-on button 124 may modify settings for certain vehicle functions to continue to operate when the vehicle is off. Settings for certain vehicle functions may comprise settings for interior lights or exterior lights, one or more sound-emitting components, one or more displays of the vehicle, a HVAC control system of the vehicle, one or more wireless communication systems of the vehicle, one or more security systems of the vehicle, or one or more accessories for the vehicle.

Stay-on mode may be configured to send an alert when a system or an accessory is ready. For example, a camp shower may be set by the user to bring water up to a desired temperature. Upon the water reaching the desired temperature, the system is ready and an alert may be generated and sent to the user. Stay-on mode may be further configured to automatically begin preparing a system or an accessory to be ready when the vehicle is placed into the designated mode. For example, upon placing the vehicle in camping mode, the camp shower may automatically begin heating the water. The system or accessory of the vehicle may be detected by proximity sensors (e.g., mechanical sensors or NFC tags). The automatic preparation may be based on the system or accessory being present. The automatic preparation may be further based on the system or accessory configured to be activated.

In particular embodiments, the do-not-disturb mode which may be controlled by do-not-disturb mode button 126 may modify settings to disable certain vehicle operations. Settings for certain vehicle functions may comprise settings for interior lights or exterior lights, one or more sound-emitting components, one or more displays of the vehicle, a HVAC control system of the vehicle, one or more wireless communication systems of the vehicle, one or more security systems of the vehicle, or one or more accessories for the vehicle.

In particular embodiments, the settings for interior lights or exterior lights may comprise activating or deactivating one or more lights (e.g., interior lights, exterior lights, or accessory lights) associated with the vehicle. In some embodiments, the settings for interior lights or exterior lights may disable activation of lights when a door of the vehicle is opened. In certain embodiments, the settings for interior lights or exterior lights may decrease the luminance of the lights. In other embodiments, the settings for interior lights or exterior lights may change the color temperature of the lights. In particular embodiments, the settings for interior lights or exterior lights may enable activation of all lights. In other embodiments, the settings for interior lights or exterior lights may be modified to produce certain illumination patterns or flashing patterns.

In particular embodiments, the settings for one or more sound-emitting components may comprise enabling or disabling the activation of the sound-emitting components. Sound emitting components that may be disabled comprise chimes or goodbye chimes, locking or unlocking tones, or a horn. In some embodiments, the sound-emitting components may be modified to produce a less invasive sound. For example, while out camping, the sound-emitting components may produce a nature-related sound (e.g., birds chirping). In other embodiments, the sound-emitting components may be modified to produce a more discreet sound. For example, the volume may be decreased on the sound emitting components. In some embodiments, the sound-emitting components may be configured as speakers capable of playing audio (e.g., music or human voices). In other embodiments, the sound-emitting components may be initially muted.

In particular embodiments, the settings for one or more displays of the vehicle, may comprise dimming a brightness of the display. The display may be dimmed to 0%.

In some embodiments, the display may be configured as a simplified user interface. The simplified user interface may comprise a subset of settings and features. The subset of settings and features may be selected by the user. The subset of settings and features may also be automatically selected based on usage rate. The usage rate may be based on frequency of use or time of use of the settings or features.

In particular embodiments, the display may be configured in a dark-mode color scheme. The dark-mode color scheme may comprise light-colored text, icons, and graphical user interface elements on a dark background. The dark background may be a black background.

In some embodiments, the display may be configured such that the display and control signals are routed to a mobile device (e.g., smartphone, tablet, or personal digital assistant). The display may be deactivated when the display and control signals are routed to the mobile device. The mobile device may act as a mobile display. The mobile device, as a mobile display, may perform the same functionality as the display.

In particular embodiments, the display may be turned off by turn off displays button 128.

In particular embodiments, the settings for the HVAC control system may be configured to remain on while the vehicle is off. The HVAC control system may be configured to maintain a set temperature.

The HVAC control system can be configured to remain on while the vehicle is turned off. The HVAC control system may be configured to maintain a set temperature. The HVAC control system may be further configured to maintain a set air quality, humidity, fan speed, or aroma. The HVAC control settings may adjust automatically to maintain the desired comfort level. The automatic adjustment may be based on predicted weather conditions.

In particular embodiments, the settings for one or more wireless communication systems may be enabled. The wireless communication systems may comprise Wi-Fi or BLUETOOTH. The wireless communications system may be configured to increase the range of the wireless communications system. The increased range may encompass an area of a campsite such that a mobile device may remain connected to the vehicle. The wireless communications system may also be configured to reduce power consumption.

In particular embodiments, the settings for one or more security systems of the vehicle may modify passive entry permissions and modifying proximity permissions.

In some embodiments, the settings for passive entry permissions may be set to disable passive entry. Generally, a passive entry system allows the door to be unlocked upon detection of the key fob within proximity of the door. Disabling the passive entry system may require the vehicle to be unlocked by pressing a button on the key fob or mobile device. Disabling the passive entry may prevent unauthorized entry to the vehicle In particular embodiments, proximity permissions may set a security profile to the security system of the vehicle. The proximity permissions may be determined based on the proximity of one or more security tokens (e.g., incorporated into a key fob for the vehicle) or one or more tracking tokens (e.g., attached to a dog's collar). The security tokens may be mobile devices, key fobs, or connected tags. The proximity of the security tokens may be determined relative to a geo-fence. The geo-fence may be a user-defined virtual fence in close proximity to the vehicle.

In some embodiments, the proximity permissions may set a secure-security profile when all security tokens are outside the geo-fence. The secure-security profile may lock the vehicle when all security tokens are outside the geo-fence. The secure-security profile may also disable passive-entry into the vehicle.

In some embodiments, the proximity permissions may set a convenience-security profile when at least one of the security tokens is inside the geo-fence. The convenience-security profile may enable passive entry into the vehicle. The convenience-security profile may keep the vehicle unlocked while the security token is within the geo-fence.

In particular embodiments, the proximity permissions may set a secure-tracking-security profile when all security tokens are outside the geo-fence and one or more tracking tokens is inside the geo-fence.

In particular embodiments, the proximity permissions may set a convenience-tracking security profile when at least one of the security tokens may be inside the geo-fence and one or more tracking tokens may be inside the geo-fence.

In particular embodiments, when the secure-tracking security profile or the convenience-tracking security profile is active, an alert may be generated when one or more of the tracking tokens leaves the area bounded by the geo-fence.

In particular embodiments, the settings for one or more accessories for the vehicle to enable or deploy the accessories. For example, a shelter accessory for the vehicle may be automatically deployed. An alert may be sent prior to the shelter being automatically deployed. The alert may require user acceptable prior to the shelter being automatically deployed.

In particular embodiments, charge warning 129 may be displayed. Charge warning 129 may be based on a remaining charge of the vehicle being below a prescribed charge threshold. The prescribed charge threshold may be displayed with charge warning 129. The prescribed charge threshold may be displayed as a range, a percentage charge, or a remaining total charge. The prescribed threshold charge may be manually set by the user. The prescribed threshold charge may also be determined automatically by a driving distance to the closest charger and may also include a margin of safety. The margin of safety may be set by the user (e.g., a percentage margin of safety or a certain number of additional miles). Upon approaching or reaching the prescribed charge threshold, an alert of the remaining charge of the vehicle may be generated and sent to the user. The alert may be sent to the user's mobile device.

A user-inputted trip plan may be used to determine charging stops. The trip plan may include information about locations (e.g., destinations, waypoints, or res areas) and a schedule. The schedule may include information about the order of the locations, an intended stop duration at each location, and a travel time between the locations. The trip plan may also include information about the intended vehicle utilization (e.g., off-roading, highway driving, or towing) and the intended vehicle accessories utilization (e.g., camp kitchen, camp shower, or HVAC system). The location and length of time stayed at the charging stops may be based on the user-inputted trip plan. For example, a longer intended stop duration, a longer travel time between locations, a more energy intensive intended vehicle utilization or intended vehicle accessories utilization may result in a longer recommended charge duration. In another example, a shorter intended stop duration, a shorter travel time between locations, a less energy intensive intended vehicle utilization or intended vehicle accessories may result in a shorter recommended charge duration.

In particular embodiments, uptime may be predicted for power-consuming features of the vehicle. The uptime may be predicted for each power-consuming feature based a rate of discharge of a battery of the vehicle based on using the power-consuming feature and the prescribed threshold. The uptime may be predicted when the power-consuming feature is drawing power from the battery on a continuous basis (e.g., lights), or on a variable basis (e.g., HVAC system). When the power-consuming feature is drawing power on a variable basis, additional factors may be used to predict the uptime, such as, for example, historical information (e.g., historical weather reports or past user-estimated usage times) or external information (e.g., current weather reports). A notification may be generated for the predicted uptime for each power-consuming feature. The notification may be delivered to the user. With the provided uptime information, the user may be better positioned to make decisions on which power-consuming features to use.

In particular embodiments, the user profile 102 may store the configuration of the settings in the designated modes. A different user profile 102 may store a different configuration of the settings in the designated modes. For example, a user profile 102 "Jorden" may configure camping mode such that 120V outlets 122 is off when camping mode toggle 120 is toggled on, whereas a user profile 102 "Susie" may configure camping mode such that 120V outlets 122 is on when camping mode toggle 120 is toggled on. Each user may independently store their configuration of settings in the designated modes. The user profile 102 may be manually selected, or be automatically selected based on determination of the user operating the vehicle. The determination may be based on a key fob or mobile device.

Figure 1B:
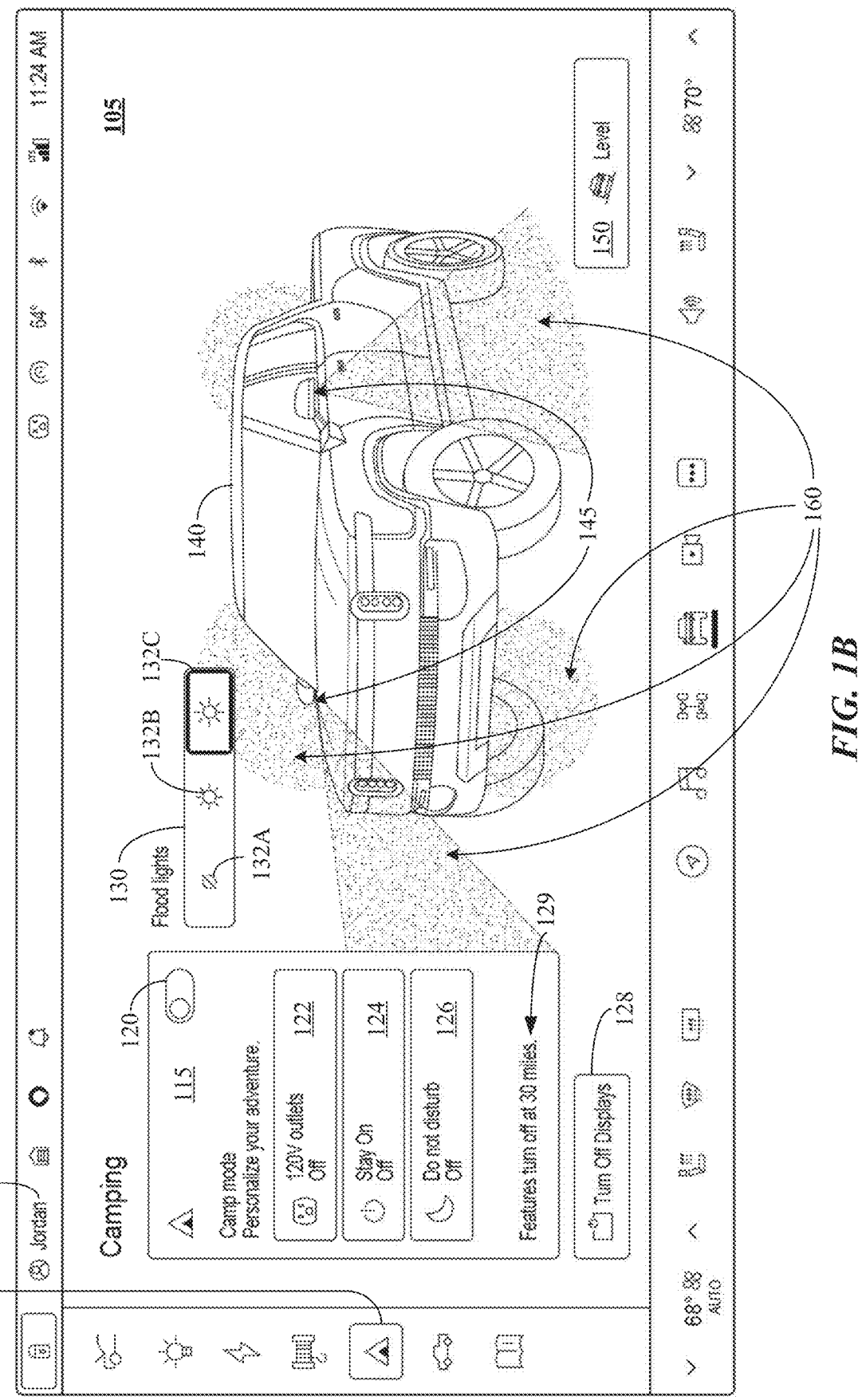
FIG. 1B illustrates an example user interface for configuring flood lights settings of a vehicle.

FIG. 1B illustrates the example user interface 100 when configuring user settings related to flood lights of a vehicle. Flood light control panel 130 may comprise flood-light off button 132A, flood-light low button 132B or flood-light high button 132C to control one or more flood lights. Selection of an active flood light setting by flood-light low button 132B or flood-light high button 132C may be represented on vehicle representation 140 as virtual flood light illumination 160. The flood lights controlled by flood light control panel 130 may be built into the vehicle or may be accessories of the vehicle.

Figure 1C:
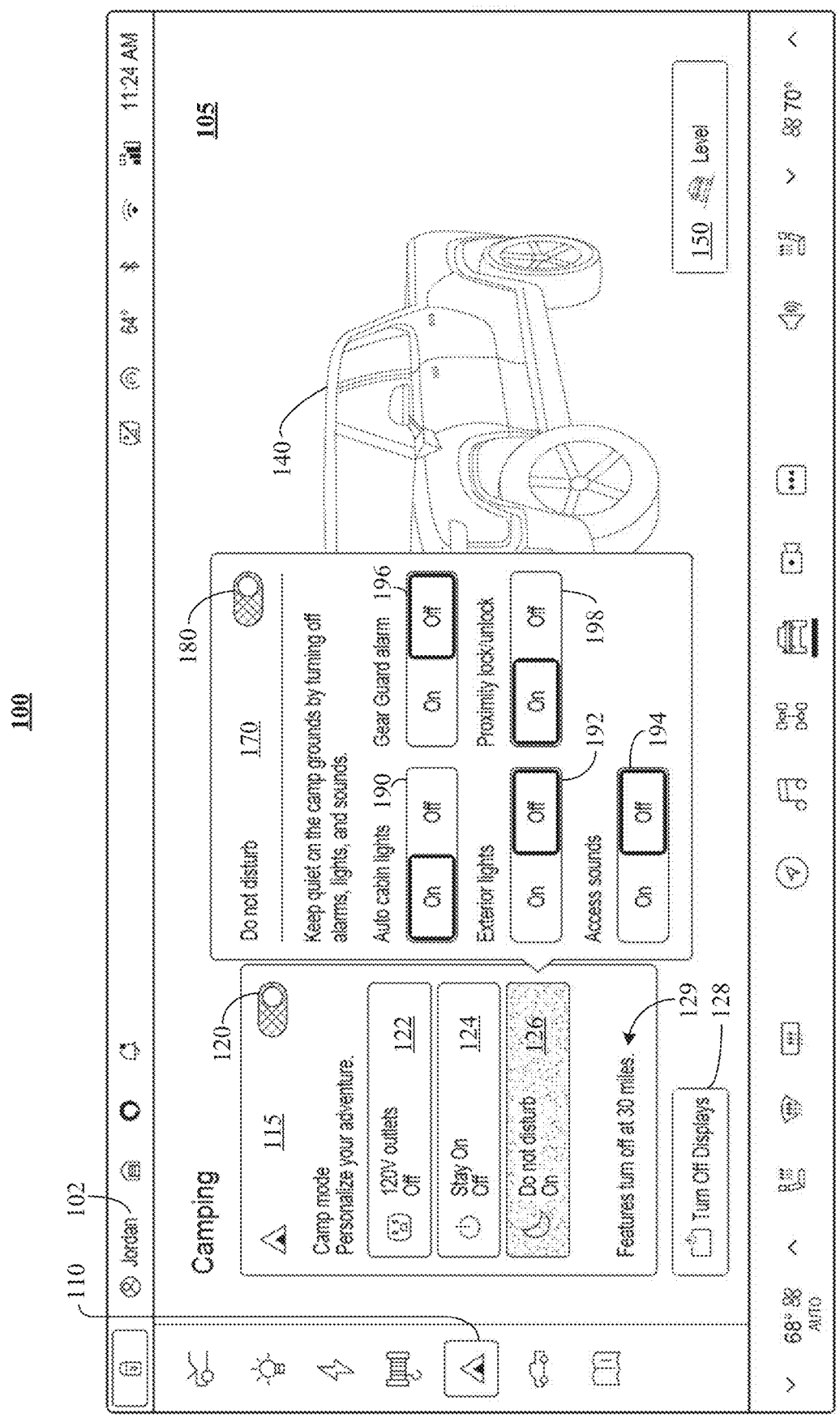
FIG. 1C illustrates an example user interface for configuring do-not-disturb settings of a vehicle.

FIG. 1C illustrates the example user interface 100 when configuring user settings related to do-not-disturb mode. Camping mode menu 115 may comprise do-not-disturb button 126. Do-not-disturb button 126 may open do-not-disturb menu 170. Do-not-disturb menu 170 may comprise do-not-disturb toggle 180. Do-not-disturb menu 170 may also comprise auto cabin lights toggle 190, exterior lights toggle 192, access sounds toggle 194, gear guard alarm toggle 196, or proximity lock/unlock toggle 198.

In some embodiments, auto cabin lights toggle 190 may toggle the auto cabin lights on or off. The auto cabin lights, when toggled on, may be interior lights that turn on automatically when one or more doors of the vehicle are opened.

In some embodiments, exterior lights toggle 192 may toggle exterior lights on or off. Exterior lights may include headlights, fog lights, parking lights, bed lights, flood lights, or accessory lights.

In some embodiments, access sounds toggle 194 may toggle access sounds on or off. Access sounds may include a welcome chime, a goodbye chime, an unlock tone, or a lock tone. Disabling the access sounds may result in no welcome chime, goodbye chime, unlock tone, or lock tone.

In some embodiments, gear guard alarm toggle 196 may toggle gear guard alarm on or off. When gear guard alarm toggle 196 is toggled on, gear guard alarm may sound or activate lights when the vehicle detects unauthorized access to the vehicle. The gear guard may be a security system. The gear guard security system may be based on cameras or connected locking accessories. When gear guard alarm toggle 196 is toggled off, gear guard alarm may not emit sounds or output lights from the vehicle when the vehicle detects unauthorized access to the vehicle. Instead, the gear guard alarm may generate and send a notification to a mobile device.

Figure 2:
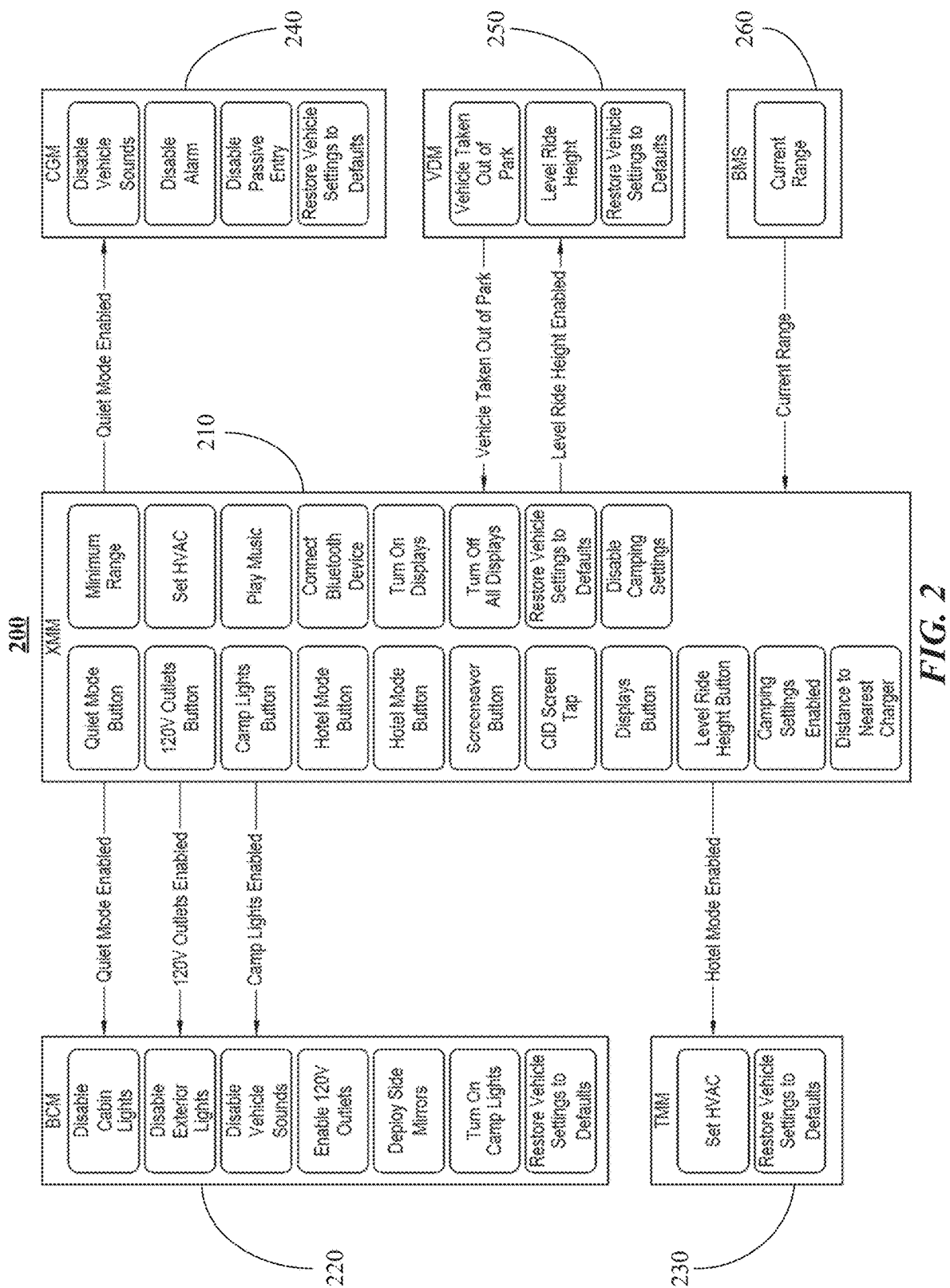
FIG. 2 is a block diagram representing functions of a user experience module interacting with other vehicle control modules to enable modification of vehicle settings when a vehicle is placed in a designated mode.

FIG. 2 is a block diagram representing logical functions of a control system 200 for the vehicle. Control system 200 enables modification of various vehicle settings when a vehicle is placed in a designated mode. In some embodiments, functions of control system 200 may be organized into a number of electronic control units (ECUs).

Features of embodiments as described herein may be controlled by Experience Management Module (XMM) ECU 210 may generate a user interface displayed on a dashboard of the vehicle. The user interface may display information and provide audio output for an infotainment system, including various views around and inside the vehicle. XMM ECU 210 may provide interactive controls for a number of different vehicle functions that may be controlled in conjunction with enabling the designated mode, such as, by way of example and not limitation: controlling interior and exterior lighting, vehicle displays (e.g., instrument cluster, center information display, and rear console display), audio output (e.g., audio processing, echo cancellation, beam focusing), music playback, heating, ventilation, and air conditioning (HVAC) controls, power settings, Wi-Fi connectivity, BLUETOOTH connectivity, satellite connectivity (e.g., satellite radio, live traffic data, live weather data), vehicle leveling, and displaying information in the user interface (e.g., surround view camera feed, distance to nearest charger, and minimum range). In some embodiments, interactive controls provided by XMM ECU 210 may enable interaction with other modules of control system 200.

Features of embodiments as described herein may be controlled by Body Control Module (BCM) ECU 220. BCM ECU 220 may provide electronic controls for various components of the body of the vehicle, such as, by way of example and not limitation: interior lighting (e.g., cabin lights, seatbelt lights), exterior lighting (e.g., headlamps, side lights, rear lights, camp lights), power outlets, frunk switch, window wiper movement and washer fluid deployment, the overhead center console, horn, power ports, and wireless accessory charging and docking. In some embodiments, BCM ECU 220 may provide electronic controls for a subset of components of the body of the vehicle that may be controlled in conjunction with enabling the designated mode, such as, by way of example and not limitation: interior lighting (e.g., cabin lights), exterior lighting (e.g., headlamps, side lights, rear lights, camp lights), audio output in the form of vehicle sounds, power outlets, and side mirrors.

Features of embodiments as described herein may be controlled by Thermal Management Module (TMM) ECU 230. TMM ECU may provide electronic controls for HVAC components that control the temperature within a passenger cabin of the vehicle, including, by way of example and not limitation, sensing cabin temperature, heating and cooling of the cabin, and controlling HVAC mode (foot mode, defrost/demist), the electronic air compressor, the HVAC blower, the air vents, and the cabin heater. TMM ECU may also or alternatively control heating and cooling of the battery pack and cooling of drive units (inverters), including, by way of example and not limitation, controlling the speed of the radiator fan, heating and cooling of energy storage system (ESS), monitoring ESS coolant temperature sensors, cooling of powertrain, and monitoring powertrain coolant temperature sensors. TMM ECU 230 may also or alternatively control heating and cooling of the battery pack and cooling of drive units (inverters), including, by way of example and not limitation, controlling the speed of the radiator fan, heating and cooling of energy storage system (ESS), monitoring ESS coolant temperature sensors, cooling of powertrain, and monitoring powertrain coolant temperature sensors. TMM ECU 230 may provide electronic controls for a subset of HVAC components that may be controlled in conjunction with enabling the designated mode, such as, by way of example and not limitation: components that control the temperature within the passenger cabin of the vehicle.

Features of embodiments as described herein may be controlled by Central Gateway Module (CGM) ECU 240. CGM ECU 240 may serve as the vehicle's communications hub that connects and transfer data to and from the various ECUs, sensors, cameras, motors, and other vehicle components. CGM ECU 240 may include a network switch that provides connectivity through Controller Area Network (CAN) ports, Local Interconnect Network (LIN) ports, and Ethernet ports. CGM ECU 240 may also serve as the master control over the different vehicle modes (e.g., road driving mode, parked mode, off-roading mode, tow mode, camping mode), and thereby control certain vehicle components related to placing the vehicle in one of the vehicle modes. In some embodiments, for electric vehicles, CGM ECU 240 may also control the vehicle charge port door and related light(s) and sensor(s). CGM ECU 240 may provide electronic controls for a subset of vehicle communications components of the vehicle that may be controlled in conjunction with enabling the designated mode, such as, by way of example and not limitation: disabling/enabling certain vehicle sounds, disabling/enabling a vehicle alarm, and disabling/enabling passive entry.

Features of embodiments as described herein may be controlled by one or more ECUs that provide functionality to control access to the vehicle. Vehicle Access System (VAS) ECU may provide passive/active wireless sensors (e.g., BLUETOOTH) authorizing accessing (i.e., locking or unlocking) the vehicle. A Near-Field Communication (NFC) ECU may support an NFC reader embedded in the vehicle (e.g., in the driver-side exterior door handle or in the armrest of the interior, driver-side door panel) for user authentication. VAS ECU may provide electronic controls for a subset of vehicle access components of the vehicle that may be controlled in conjunction with enabling the designated mode, such as, by way of example and not limitation: disabling/enabling passive entry.

Features of embodiments as described herein may be controlled by Vehicle Dynamics Module (VDM) ECU 250. VDM ECU 250 may control a number of different functions related to aspects of the vehicle's drivetrain, regenerative braking, suspension, steering, traction control, distribution of mass, aerodynamics, and driving modes. In some embodiments, VDM ECU 250 may, by way of example and not limitation, control vehicle acceleration, control vehicle energy regeneration, calculate torque distribution, provide traction control, control drive modes, provide odometer functions, control driveline disconnects, adjust damping, adjust roll stiffness, adjust ride height, automatically level a vehicle when on a slope, and control the emergency parking brake driver. VDM ECU 250 may provide electronic controls for a subset of vehicle drive components of the vehicle that may be controlled in conjunction with enabling the designated mode, such as, by way of example and not limitation: disabling the designated mode when the vehicle is taken out of parked mode, and leveling the vehicle.

Features of embodiments as described herein may be controlled by one or more ECUs that provide functionality related to the battery pack of the vehicle. Battery Management System (BMS) ECU 260 may control and monitor a number of different aspects related to the electric vehicle battery system. Functions that may be controlled by the BMS ECU 260 may include, by way of example and not limitation, controlling the battery pack contactors and pre-charge relay, monitoring the high voltage connector, measuring the pack puncture sensor resistance and pack water sensor resistance, controlling the battery pack fans, measuring busbar temperature, communicating with Battery Power Isolation (BPI) and Balancing Voltage Temperature (BVT) ECUs, and calculate state-of-charge (SoC) and battery state-of-health (SoH). A BPI ECU may provide high-voltage sensing, measure the battery pack current, and facilitate determination of pack isolation. A BVT ECU may monitor battery module cell voltages, monitor temperature, and execute cell balancing. BMS ECU 260 may provide electronic controls for a subset of vehicle battery components of the vehicle that may be controlled in conjunction with enabling the designated mode, such as, by way of example and not limitation: determining a current range of the vehicle based on a battery charge level.

Figure 3A:
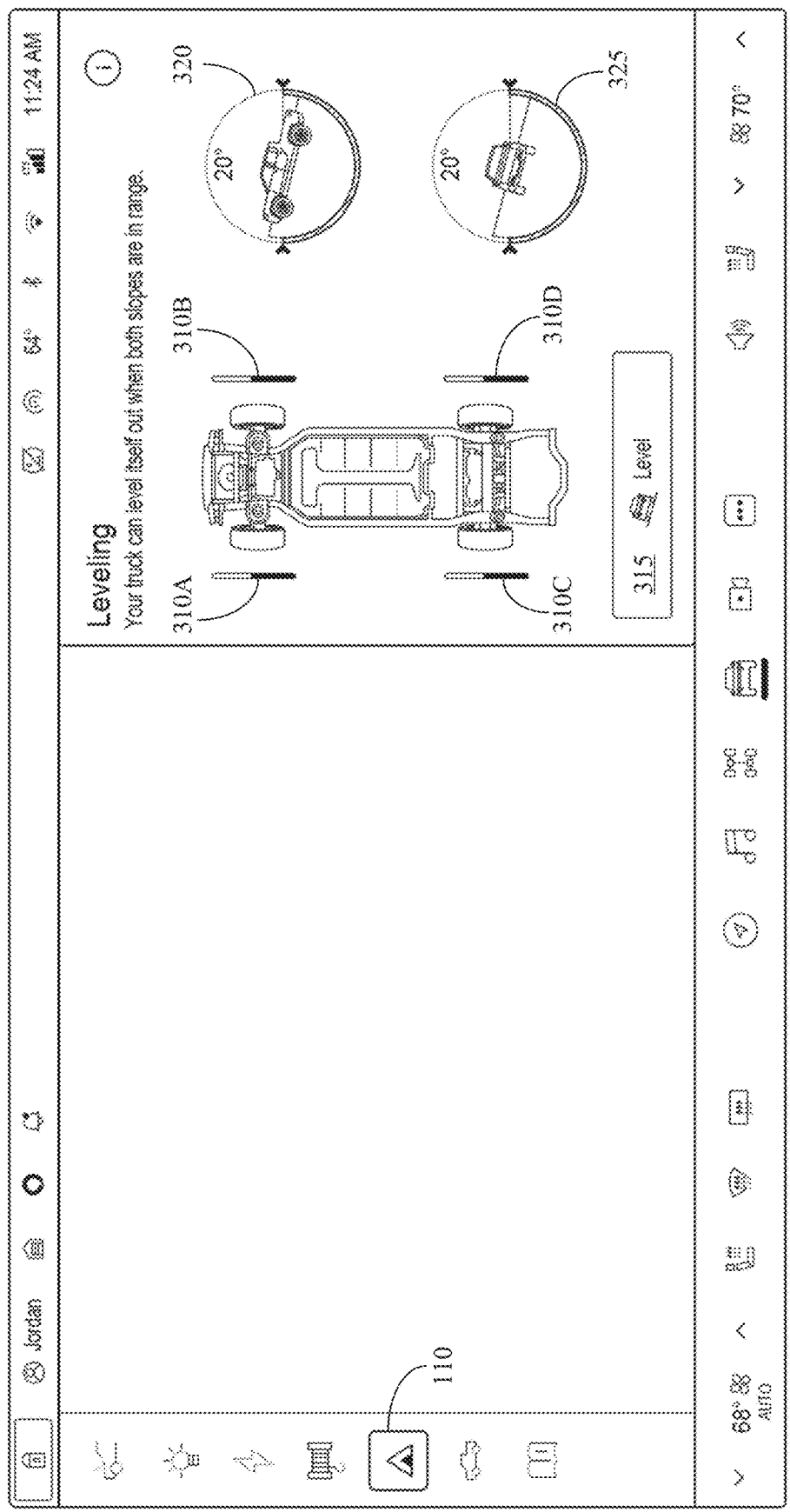
FIG. 3A illustrates an example user interface for activating vehicle leveling.

FIG. 3A illustrates an example user interface for activating vehicle leveling 300 when the vehicle is within complete leveling parameters. User interface for activating vehicle leveling 300 may comprise front right suspension indicator 310A, front left suspension indicator 310B, rear right suspension indicator 310C, and rear left suspension indicator 310D. User interface for activating vehicle leveling 300 may also comprise pitch indicator 320 and roll indicator 325. User interface for activating vehicle leveling 300 may also comprise leveling button 315 and may be used to activate automatic vehicle leveling.

Front right suspension indicator 310A, front left suspension indicator 310B, rear right suspension indicator 310C, and rear left suspension indicator 310D may display the position of the current position of each respective suspension. For example, a fully compressed suspension may be indicated by a bar being filled, and a fully extended suspension may be indicated by a bar being completely empty. When the suspension is fully compressed, the suspension may not be further be compressed to reduce a pitch or roll of the vehicle. When the suspension is fully extended, the suspension may not be extended to reduce the pitch or roll of the vehicle.

Pitch indicator 320 and roll indicator 325 may display the angle of pitch and roll respectively of the vehicle. Pitch indicator 320 and roll indicator 325 may further display whether the pitch or roll of the vehicle may be within bounds based on the current suspension positions.

Figure 3B:
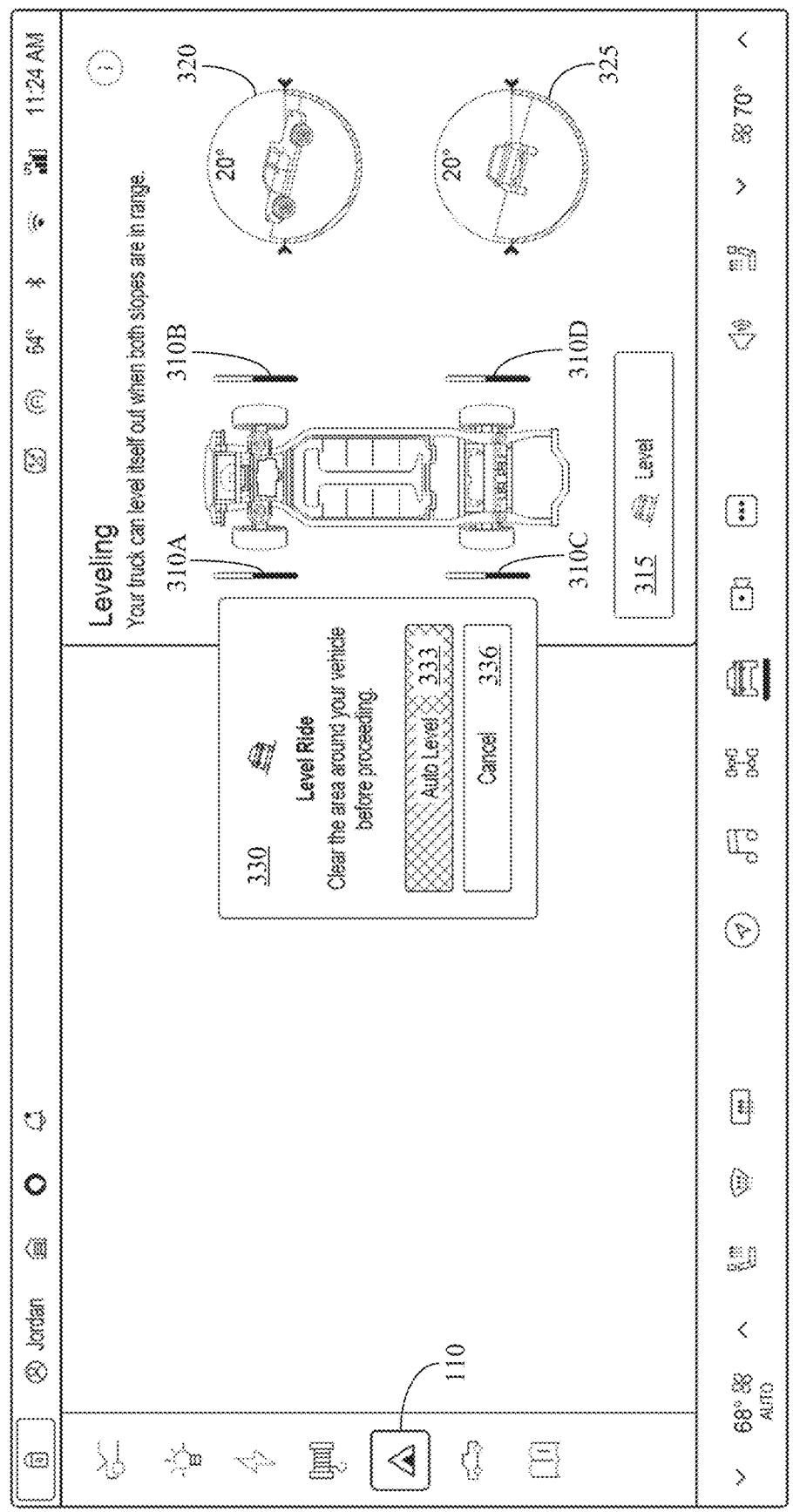
FIG. 3B illustrates an example confirmation screen of a user interface for activating vehicle leveling.

FIG. 3B illustrates an example confirmation screen of a user interface for activating vehicle leveling 300. Confirmation screen of a user interface for activating vehicle leveling 300 may comprise warning notification 330. Warning notification 330 may comprise confirmation button 333 and cancel button 336. Warning notification 330 may remind the user to ensure the level around the vehicle is clear before enabling auto leveling of the vehicle.

In some embodiments, status indicators of the vehicle may be determined to satisfy certain leveling conditions for the sending the signals to adjust the electronically controlled suspension of the vehicle. The leveling conditions may comprise a speed of the vehicle being zero, the vehicle being in a park mode, a gear selection of the vehicle being in park, a parking brake of the vehicle being engaged, a steering angle of the vehicle being within a prescribed steering range, occupancy-related sensors of the vehicle indicating the vehicle as being unoccupied, position sensors of the vehicle indicating doors or openings of the vehicle as being closed, sensors of the vehicle predicting zero likelihood of collision with objects near the vehicle once the electronically controlled suspension of the vehicle is adjusted to be level, a computed range of travel of the electronically controlled suspension required to level the vehicle being within a maximum possible range of travel of electronically controlled suspension.

In particular embodiments, the electronically controlled suspension may not activate until each required leveling condition is satisfied. A notification may be generated and delivered to the user when one or more leveling conditions are not satisfied. The electronically controlled suspension may be re-activated or continue to operate when all required leveling conditions are satisfied.

In some embodiments, the vehicle being in a park mode may be when the gear selection of the vehicle is in park, the parking brake is engaged, or the vehicle is turned off.

In some embodiments, a leveling condition may be where the steering angle of the vehicle being within a prescribed steering range to prevent damage to the vehicle. Potential damage that may occur to the vehicle may include damage to the body work of the vehicle. Other damage may include damage to the suspension or other mechanical components of the vehicle. The prescribed steering range of the vehicle may a range where the wheels of the vehicle are in a neutral position, or where the wheels of the vehicle are pointed in a forwards direction.

In some embodiments the sensors of the vehicle predicting zero likelihood of collision with objects near the vehicle may comprise ultrasonic sensors, LIDAR, or cameras. The one or more sensors may detect objects near the vehicle. A space occupied by the vehicle may be computed. The calculated space occupied by the vehicle may be calculated for the vehicle prior to leveling, the vehicle after leveling, and the space occupied by the vehicle as it is being leveled. The calculated space occupied by the vehicle may also include accessories attached to the vehicle. From the calculated space, a determination may be made regarding the likelihood of collision with objects above or below the calculated space. Also from the calculated space, a determination may be made regarding the likelihood of collision with objects proximate to the vehicle. The determination of likelihood of collision with objects proximate to the vehicle may be include space required to operate the doors of the vehicle or the accessories attached to the vehicle.

In some embodiments, the electronically controlled suspension may not activate until each required moving condition is satisfied. Moving conditions may comprise the speed of the vehicle being zero, the vehicle in park mode, the gear selection of the vehicle being in park, the parking brake of the vehicle being engaged; or the steering angle of the vehicle being within a prescribed steering range. An adjustment of the electronically controlled suspension of the vehicle to the starting state may be sent when each required moving condition is satisfied. The electronically controlled suspension may be re-activated or continue to operate when all required moving conditions are satisfied.

Figure 3C:
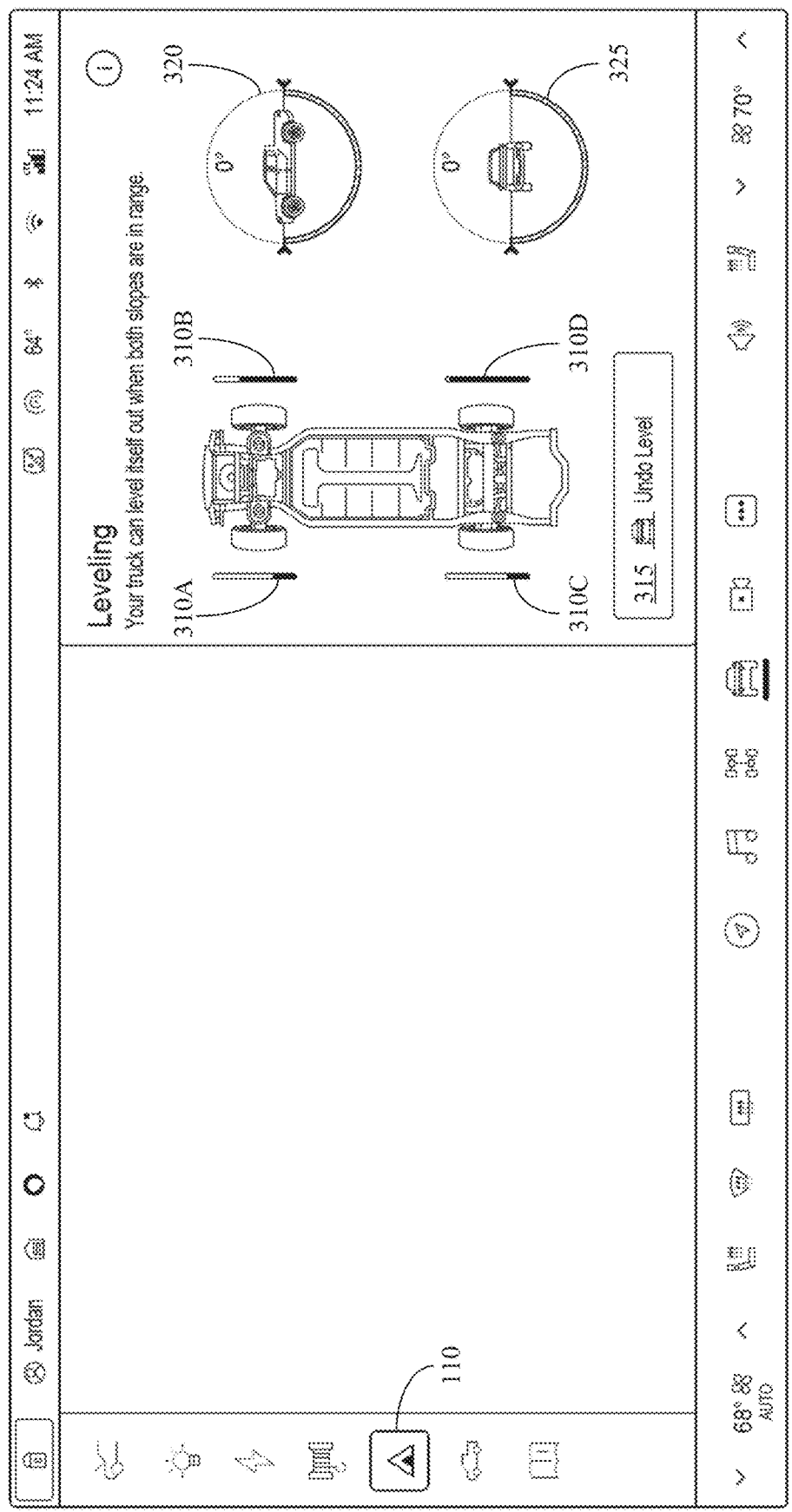
FIG. 3C illustrates an example user interface when vehicle leveling has been completed.

FIG. 3C illustrates an example user interface when vehicle leveling has been completed 300. User interface when vehicle leveling has been completed 300 may comprise leveled front right suspension indicator 310A, leveled front left suspension indicator 310B, leveled rear right suspension indicator 310C, and leveled rear left suspension indicator 310D. Leveled suspension indicators 310A-D may show the position of the suspension after leveling has been completed. User interface when vehicle leveling has been completed 300 may also comprise undo level button 315. Undo level button 315 may revert the position of the suspension back to the position before leveling (i.e., the original position). User interface when vehicle leveling has been completed 300 may also comprise leveled pitch indicator 320 and leveled roll indicator 325. Leveled pitch indicator 320 and leveled roll indicator 325 may show the vehicle has having 0 degree pitch and 0 degree roll.

Figure 4:
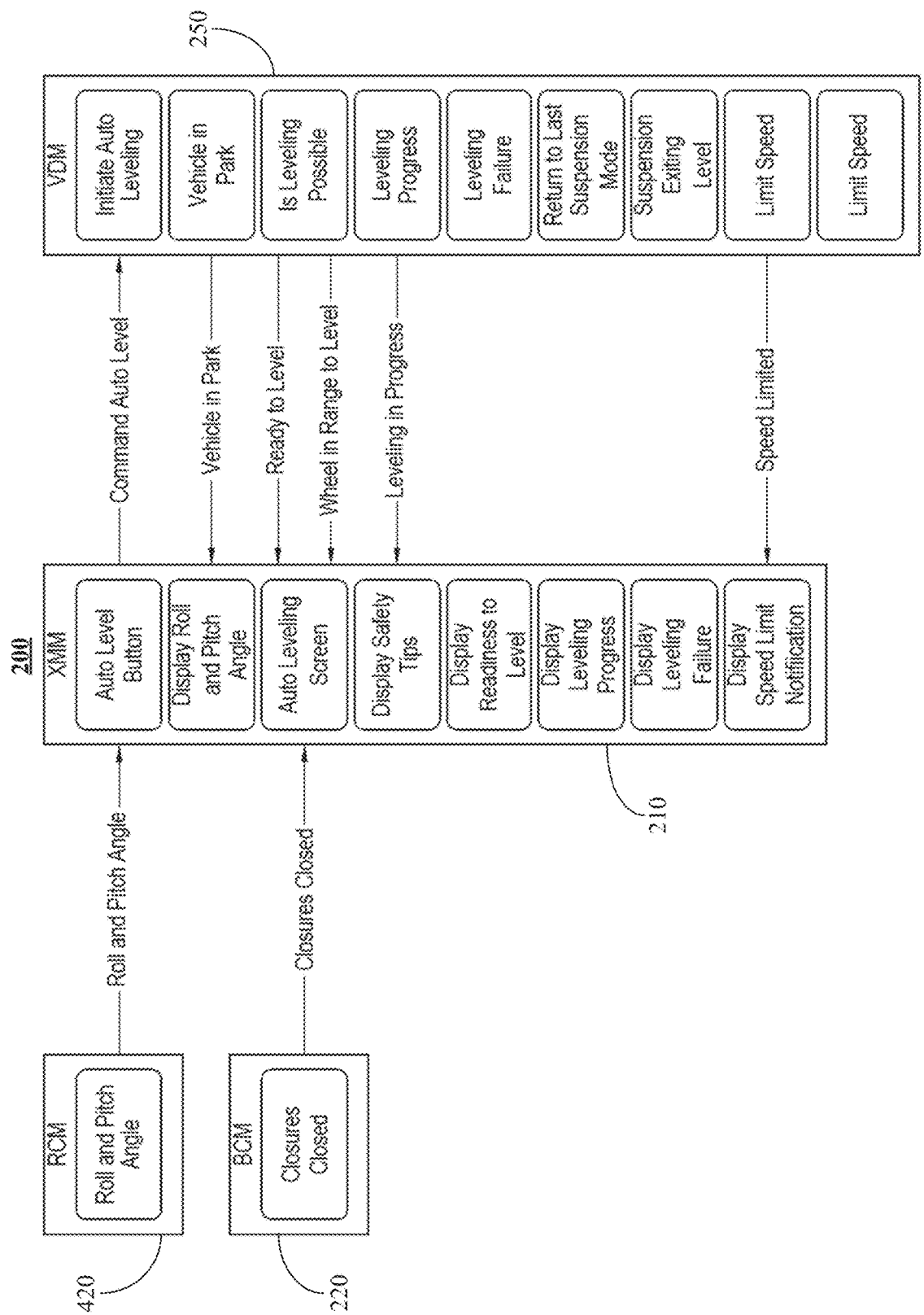
FIG. 4 is a block diagram representing functions of a user experience module interacting with other vehicle control modules to enable vehicle leveling when a vehicle is placed in a designated mode.

FIG. 4 is a block diagram representing additional logical functions of the control system 200. The user interface generated by Experience Management Module (XMM) ECU 210 may provide interactive controls for additional vehicle functions that may be controlled in conjunction with enabling the designated mode, such as, by way of example and not limitation: auto-leveling the vehicle, displaying information related to auto-leveling the vehicle (e.g., roll and pitch angle, readiness to level, leveling progress, notification of leveling failure), and displaying other information (e.g., speed limit notifications, and safety tips).

Restraints Control Module (RCM) ECU 420 may provide additional electronic controls for components of a passive safety system of the vehicle that may be controlled in conjunction with enabling the designated mode, and may include, by way of example and not limitation, sensing a roll and pitch angle of the vehicle or sensing that one or more occupants are properly restrained (e.g. with a seat belt).

BCM ECU 220 may provide additional electronic controls for components of the body of the vehicle that may be controlled in conjunction with enabling the designated mode, such as, by way of example and not limitation: ensuring that all closures (e.g., doors, tailgate, tonneau cover, frunk, trunk, gear tunnel doors) are closed prior to commencing leveling of the vehicle.

VDM ECU 250 may control additional functions in conjunction with enabling the designated mode, such as, by way of example and not limitation: initiating automatic leveling of the vehicle, determining whether the vehicle is in parked mode, determining whether level is possible, monitoring leveling progress, determining leveling failure, returning the vehicle to the last suspension mode, determining that the suspension is exiting a level state, and limiting speed of the vehicle after the vehicle has been auto-leveled (until the suspension returns to a safe driving range).

Figure 5:
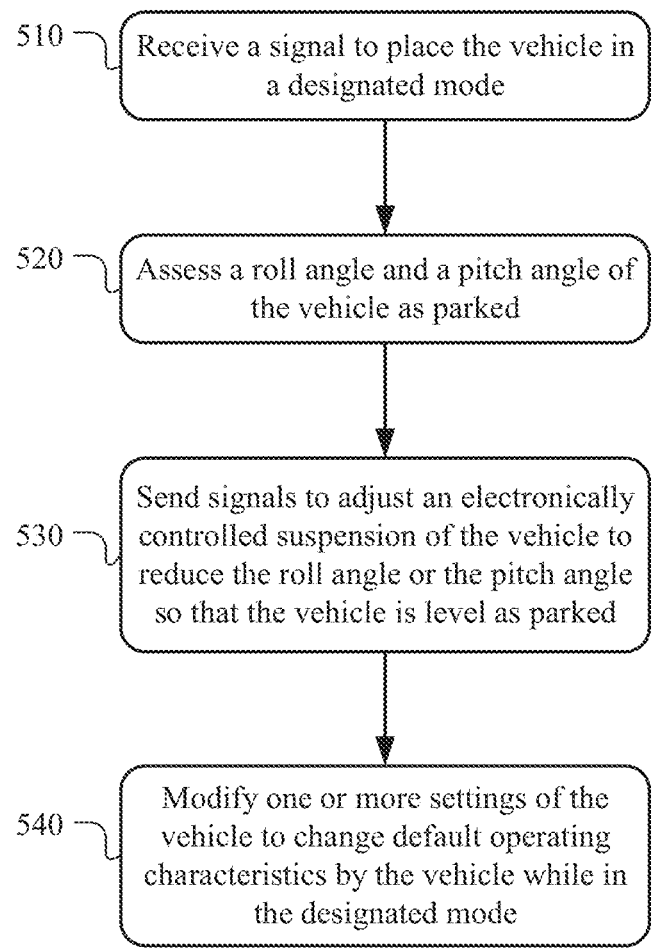
FIG. 5 is a flowchart illustrating a method of creating a desired environment for special situational use of a vehicle.

FIG. 5 is a flowchart illustrating steps of a method of creating a desired environment for special situational use of a vehicle. Method 500 may begin at block 510 with the control module receiving a signal to place the vehicle in the designated mode. Method 500 may then continue at block 520 with the control module assessing a roll angle and a pitch angle of the vehicle as parked. Method 500 may then continue at block 530 with the control module sending signals to adjust an electronically controlled suspension of the vehicle to reduce the roll angle or the pitch angle of the vehicle so that the vehicle is level as parked. Method 500 may be then continue at block 540 with the control module modifying one or more settings of the vehicle to change default operating characteristics by the vehicle while in the designated mode.

As described herein, some embodiments may permit activation of vehicle leveling when a pitch or roll of a vehicle is outside a range for complete leveling. In such situations, the confirmation screen of the user interface for activating vehicle leveling when a pitch or roll of a vehicle is outside a range for complete leveling may include a warning notification displayed together with a button to cancel or confirm the leveling operation. In some embodiments, the user interface may show the position of the suspension after partial-leveling has been completed, including a notification regarding any residual detected pitch or roll. The user interface for activating vehicle leveling may also comprise an "undo level" button that reverts the position of the suspension back to the position before leveling (i.e., the original position). As described herein, the method of creating a desired environment for special situational use of a vehicle may include modification of other settings of the vehicle.

Particular embodiments may repeat one or more steps of the method of FIG. 5, where appropriate. Although this disclosure describes and illustrates particular steps of the method of FIG. 5 as occurring in a particular order, this disclosure contemplates any suitable steps of the method of FIG. 5 occurring in any suitable order. Moreover, although this disclosure describes and illustrates an example method of creating a desired environment for special situational use of a vehicle including the particular steps of the method of FIG. 5, this disclosure contemplates any suitable method of creating a desired environment for special situational use of a vehicle including any suitable steps, which may include all, some, or none of the steps of the method of FIG. 5, where appropriate. Furthermore, although this disclosure describes and illustrates particular components, devices, or systems carrying out particular steps of the method of FIG. 5, this disclosure contemplates any suitable combination of any suitable components, devices, or systems carrying out any suitable steps of the method of FIG. 5.

Figure 6:
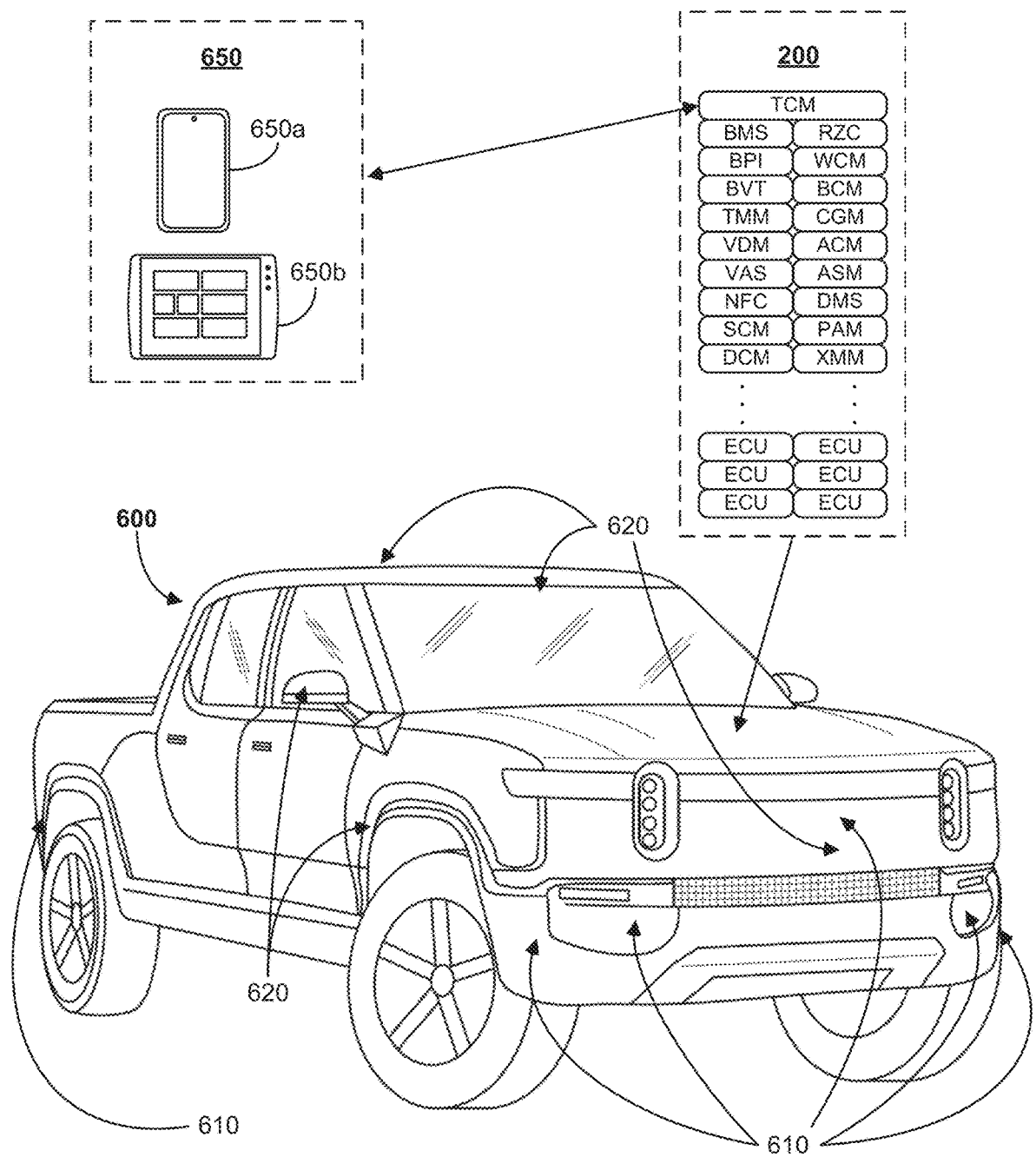
FIG. 6 illustrates an example vehicle.

FIG. 6 illustrates an example vehicle 600. Vehicle 600 may include multiple sensors 610, multiple cameras 620, and control system 200. In some embodiments, vehicle 600 may be able to pair with a computing device 650 (e.g., smartphone 650a, tablet computing device 650b, personal digital assistant, or a smart vehicle accessory). As an example and not by way of limitation, a sensor 610 may be an accelerometer, a gyroscope, a magnetometer, a global positioning satellite (GPS) signal sensor, a vibration sensor (e.g., piezoelectric accelerometer), a light detection and ranging (LiDAR) sensor, a radio detection and ranging (RADAR) sensor, an ultrasonic sensor, a temperature sensor, a pressure sensor, a humidity sensor, a chemical sensor, an electromagnetic proximity sensor, an electric current sensor, another suitable sensor, or a combination thereof. As an example and not by way of limitation, a camera 620 may be a still image camera, a video camera, a 3D scanning system (e.g., based on modulated light, laser triangulation, laser pulse, structured light, light detection and ranging (LiDAR)), an infrared camera, another suitable camera, or a combination thereof. Vehicle 600 may include various controllable components (e.g., doors, seats, windows, lights, HVAC, entertainment system, security system), instrument and information displays and/or interactive interfaces, functionality to pair a computing device 650 with the vehicle (which may enable control of certain vehicle functions using the computing device 650), and functionality to pair accessories with the vehicle, which may then be controllable through an interactive interface in the vehicle or through a paired computing device 650.

Control system 200 may enables control of various systems on-board the vehicle. As shown in FIGS. 2, 4, and 6, control system 200 may comprise one or more electronic control units (ECUs), each of which are dedicated to a specific set of functions. Each ECU may be a computer system (as described further in FIG. 7), and each ECU may include functionality provide by one or more of the example ECUs described below.

The vehicle 600 may include one or more additional ECUs, such as, by way of example and not limitation: a Near-Field Communication (NFC) ECU, a Seat Control Module (SCM) ECU, a Door Control Module (DCM) ECU, a Rear Zone Control (RZC) ECU, an Autonomy Control Module (ACM) ECU, an Autonomous Safety Module (ASM) ECU, a Driver Monitoring System (DMS) ECU, and/or a Winch Control Module (WCM) ECU. If vehicle 600 is an electric vehicle, one or more ECUs may provide functionality related to the battery pack of the vehicle, such as, by way of example and not limitation: the Battery Management System (BMS) ECU, the Battery Power Isolation (BPI) ECU, the Balancing Voltage Temperature (BVT) ECU, and/or the Thermal Management Module (TMM) ECU.

Figures 7A, 7B:
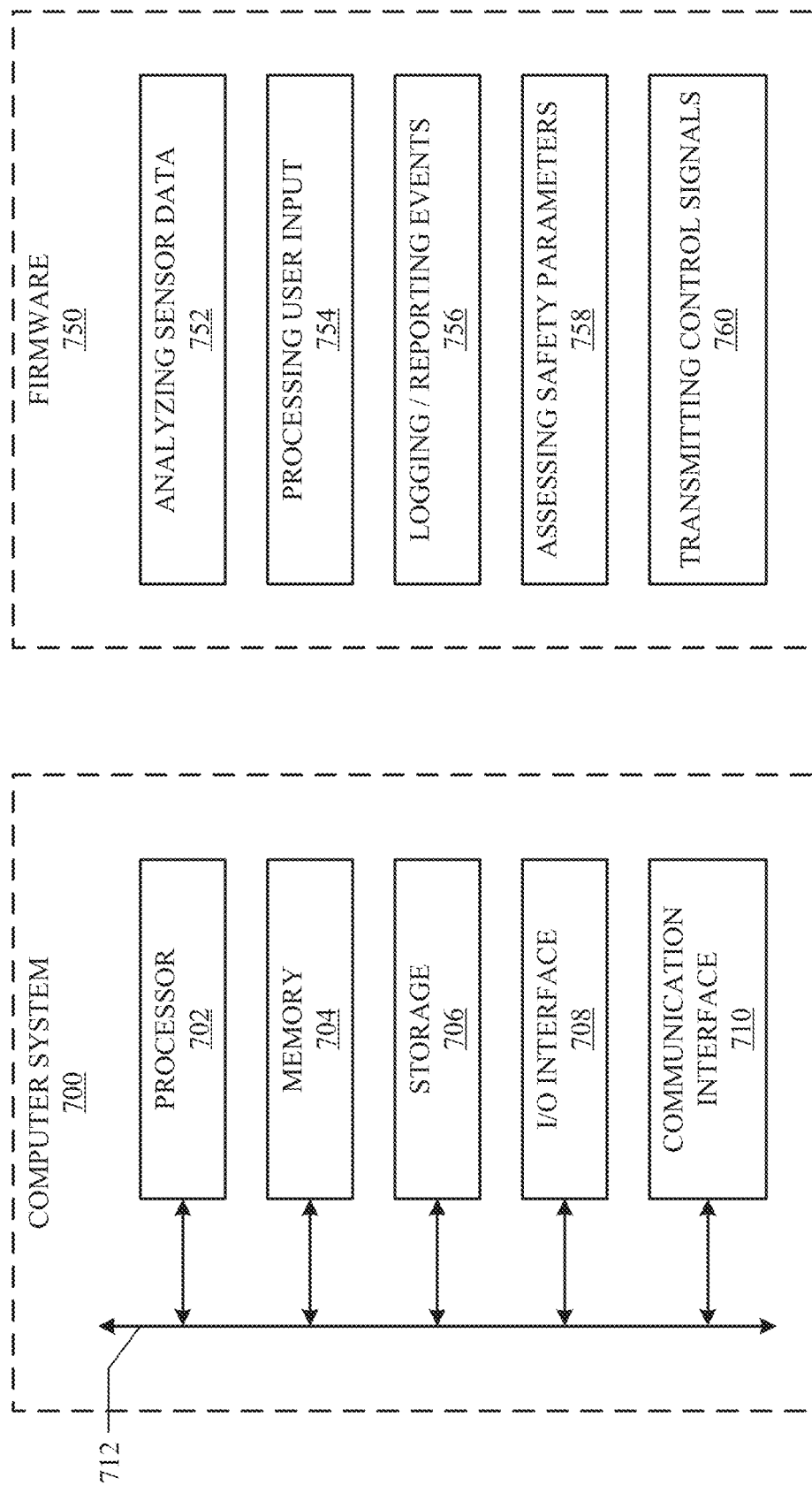
FIG. 7A is a schematic of an example computer system.
FIG. 7B illustrates example firmware for a vehicle ECU.

FIG. 7A illustrates an example computer system 700. Computer system 700 may include a processor 702, memory 704, storage 706, an input/output (I/O) interface 708, a communication interface 710, and a bus 712. Although this disclosure describes one example computer system including specified components in a particular arrangement, this disclosure contemplates any suitable computer system with any suitable number of any suitable components in any suitable arrangement. As an example and not by way of limitation, computer system 700 may be an electronic control unit (ECU), an embedded computer system, a system-on-chip, a single-board computer system, a desktop computer system, a laptop or notebook computer system, a mainframe, a mesh of computer systems, a mobile telephone, a personal digital assistant, a server computing system, a tablet computer system, or a combination of two or more of these. Where appropriate, computer system 700 may include one or more computer systems 700; be unitary or distributed, span multiple locations, machines, or data centers; or reside in a cloud, which may include one or more cloud components in one or more networks. Where appropriate, computer system(s) 700 may perform, at different times or at different locations, in real time or in batch mode, one or more steps of one or more methods described or illustrated herein.

Processor 702 (e.g., compute units) may include hardware for executing instructions, such as those making up a computer program. As an example and not by way of limitation, to execute instructions, processor 702 may retrieve (or fetch) the instructions from an internal register, an internal cache, memory 704, or storage 706; decode and execute them; and then write one or more results to an internal register, an internal cache, memory 704, or storage 706 (e.g., storage units). Processor 702 may include one or more internal caches for data, instructions, or addresses.

In particular embodiments, memory 704 includes main memory for storing instructions for processor 702 to execute or data for processor 702 to operate on. In particular embodiments, one or more memory management units (MMUs) reside between processor 702 and memory 704 and facilitate accesses to memory 704 requested by processor 702. In particular embodiments, memory 704 includes random access memory (RAM). This disclosure contemplates any suitable RAM.

In particular embodiments, storage 706 includes mass storage for data or instructions. As an example and not by way of limitation, storage 706 may include a removable disk drive, flash memory, an optical disc, a magneto-optical disc, magnetic tape, or a Universal Serial Bus (USB) drive, or two or more of these. Storage 706 may include removable or fixed media and may be internal or external to computer system 700. Storage 706 may include any suitable form of non-volatile, solid-state memory or read-only memory (ROM).

In particular embodiments, I/O interface 708 includes hardware, software, or both, providing one or more interfaces for communication between computer system 700 and one or more input and/or output (I/O) devices. Computer system 700 may be communicably connected to one or more of these I/O devices, which may be incorporated into, plugged into, paired with, or otherwise communicably connected to vehicle 600 (e.g., through the telematics control module ECU). The TCM ECU may provide a wireless vehicle communication gateway for the vehicle. An input device may include any suitable device for converting volitional user input into digital signals that can be processed by computer system 700, such as, by way of example and not limitation, a steering wheel, a touch screen, a microphone, a joystick, a scroll wheel, a button, a toggle, a switch, a dial, or a pedal. An input device may include one or more sensors for capturing different types of information, such as, by way of example and not limitation, sensors 610 described above. An output device may include devices designed to receive digital signals from computer system 700 and convert them to an output format, such as, by way of example and not limitation, speakers, headphones, a display screen, a heads-up display, a lamp, a smart vehicle accessory, another suitable output device, or a combination thereof. This disclosure contemplates any suitable I/O devices and any suitable I/O interfaces 708 for them. I/O interface 708 may include one or more I/O interfaces 708, where appropriate.

In particular embodiments, communication interface 710 includes hardware, software, or both providing one or more interfaces for data communication between computer system 700 and one or more other computer systems 700 or one or more networks. Communication interface 710 may include one or more interfaces to a controller area network (CAN) or to a local interconnect network (LIN). Communication interface 710 may include one or more of a serial peripheral interface (SPI) or an isolated serial peripheral interface (isoSPI). In some embodiments, communication interface 710 may include a network interface controller (NIC) or network adapter for communicating with an Ethernet or other wire-based network or a wireless NIC (WNIC) or wireless adapter for communicating with a wireless network, such as a WI-FI network or a cellular network.

In particular embodiments, bus 712 includes hardware, software, or both coupling components of computer system 700 to each other. Bus 712 may include any suitable bus, as well as one or more buses 712, where appropriate. Although this disclosure describes a particular bus, any suitable bus or interconnect is contemplated.

Herein, a computer-readable non-transitory storage medium or media may include one or more semiconductor-based or other integrated circuits (ICs) (such, as for example, field-programmable gate arrays or application-specific ICs), hard disk drives, hybrid hard drives, optical discs, optical disc drives, magneto-optical discs, magneto-optical drives, solid-state drives, RAM drives, any other suitable computer-readable non-transitory storage media, or any suitable combination. A computer-readable non-transitory storage medium may be volatile, non-volatile, or a combination of volatile and non-volatile, where appropriate.

FIG. 7B illustrates example firmware 750 for a vehicle ECU 700 as described with respect to control system 200. Firmware 750 may include functions 752 for analyzing sensor data based on signals received from sensors 610 or cameras 620 received through communication interface 710. Firmware 750 may include functions 754 for processing user input (e.g., directly provided by a driver of or passenger in vehicle 600, or provided through a computing device 650) received through I/O interface 708. Firmware 750 may include functions 756 for logging detected events (which may be stored in storage 706 or uploaded to the cloud), as well as functions for reporting detected events (e.g., to a driver or passenger of the vehicle through an instrument display or interactive interface of the vehicle, or to a vehicle manufacturer, service provider, or third party through communication interface 710). Firmware 750 may include functions 758 for assessing safety parameters (e.g., monitoring the temperature of a vehicle battery or the distance between vehicle 600 and nearby vehicles). Firmware 750 may include functions 760 for transmitting control signals to components of vehicle 600, including other vehicle ECUs 700.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising:
receiving, by a control module, a signal to place a vehicle in a designated mode corresponding to a desired operating environment, wherein the designated mode includes modifications to one or more default operating characteristics of the vehicle while the vehicle is in parked mode and a vehicle access key associated with the vehicle is within proximity of the vehicle;

in response to receiving the signal:
identifying the one or more default operating characteristics of the vehicle to be modified in order to create the desired operating environment, wherein the one or more default operating characteristics relate to one or more power-consuming features or available power for connected accessories;
predicting an uptime for each of the one or more power-consuming features; and
modifying, by the control module, one or more settings of the vehicle to change at least one of the one or more default operating characteristics while in the designated mode based on the predicted uptime of the corresponding power-consuming feature.

2. The method of claim 1, further comprising:
generating a notification for a user of the vehicle in relation to the predicted uptime.

3. The method of claim 1, further comprising:
determining that a remaining charge of the vehicle is below a prescribed charge threshold; and
providing, by the control module, an alert when the remaining charge of the vehicle is below the prescribed charge threshold.

4. The method of claim 3, wherein the prescribed charge threshold is automatically determined by the control module based on a driving distance to a closest charger for the vehicle.

5. The method of claim 1, further comprising:
receiving power settings comprising:
a designation of essential vehicle functions;
a designation of optional vehicle functions; or
a designation of unnecessary vehicle functions; and
modifying the one or more settings of the vehicle based on the received power settings.

6. The method of claim 5, wherein the modifying the one or more settings of the vehicle comprises:
modifying settings of a power control system of the vehicle comprising:
enabling power delivery to the essential vehicle functions;
enabling power delivery to the optional vehicle functions until a prescribed charge threshold is met; or
disabling power delivery to the unnecessary vehicle functions.

7. The method of 1, further comprising:
receiving, by the control module, a trip plan, wherein the trip plan comprises:
one or more locations;
an order of travel of the one or more locations;
a time interval for each of the locations;
an intended vehicle utilization; or
an intended vehicle accessories utilization; and
determining, by the control module and based on the trip plan, charging stops.

8. The method of claim 7, wherein a length of time to stay at each of the charging stops is determined based on the trip plan.

9. The method of claim 1, further comprising:
generating, by the control module and while the vehicle is in the designated mode, a notification regarding a status of a system or an accessory of the vehicle being ready.

10. The method of claim 1, further comprising:
determining, by the control module, an amount of charge of the vehicle, wherein the uptime for each of the one or more power-consuming features is predicted based on the amount of charge of the vehicle.

11. The method of claim 1, wherein the uptime is predicted based on a state of the vehicle and at least one of: historical information associated with the desired operating environment, current information associated with the desired operating environment, or historical user usage patterns of the one or more power-consuming features.

12. The method of claim 1, wherein the uptime is predicted for each of the one or more power-consuming features based on a rate of discharge of a battery of the vehicle.

13. The method of claim 12, wherein the rate of discharge of the battery for the power-consuming feature is based on the vehicle using the power-consuming feature and a prescribed charge threshold.

14. A system comprising:
a control module comprising a processor and one or more programs stored in a memory that, when executed by the processor, causes the control module to:
receive a signal to place a vehicle in a designated mode corresponding to a desired operating environment, wherein the designated mode includes modifications to one or more default operating characteristics of the vehicle while the vehicle is in parked mode and a vehicle access key associated with the vehicle is within proximity of the vehicle;
in response to receiving the signal:
identify the one or more default operating characteristics of the vehicle to be modified in order to create the desired operating environment, wherein the one or more default operating characteristics relate to one or more power-consuming features or available power for connected accessories;
predict an uptime for each of the one or more power-consuming features; and
modify one or more settings of the vehicle to change at least one of the one or more default operating characteristics while in the designated mode based on the predicted uptime of the corresponding power-consuming feature.

15. The system of claim 14, wherein the uptime is predicted based on a state of the vehicle and one or more of: historical information associated with the desired operating environment, current information associated with the desired operating environment, and historical user usage patterns of the one or more power-consuming features.

16. The system of claim 14, wherein the uptime is predicted for each of the one or more power-consuming features based on a rate of discharge of a battery of the vehicle.

17. The system of claim 16, wherein the rate of discharge of the battery for the power-consuming feature is based on the vehicle using the power-consuming feature and a prescribed charge threshold.

18. A non-transitory computer-readable storage medium storing one or more programs comprising instructions that, when executed by a control module of a vehicle, causes the control module to:
receive a signal to place a vehicle in a designated mode corresponding to a desired operating environment, wherein the designated mode includes modifications to one or more default operating characteristics of the vehicle while the vehicle is in parked mode and a vehicle access key associated with the vehicle is within proximity of the vehicle;
in response to receiving the signal:
identify the one or more default operating characteristics of the vehicle to be modified in order to create the desired operating environment, wherein the one or more default operating characteristics relate to one or more power-consuming features or available power for connected accessories;

predict an uptime for each of the one or more power-consuming features; and modify one or more settings of the vehicle to change at least one of the one or more default operating characteristics while in the designated mode based on the predicted uptime of the corresponding power-consuming feature.

19. The non-transitory computer-readable storage medium of claim 18, wherein the uptime is predicted based on a state of the vehicle and one or more of: historical information associated with the desired operating environment, current information associated with the desired operating environment, and historical user usage patterns of the one or more power-consuming features.

20. The non-transitory computer-readable storage medium of claim 18, wherein the uptime is predicted for each of the one or more power-consuming features based on a rate of discharge of a battery of the vehicle.

* * * * *